S. S. GOLDMAN.
ANIMAL TRAP.
APPLICATION FILED JAN. 18, 1913.
1,082,942.
Patented Dec. 30, 1913.
2 SHEETS—SHEET 1.
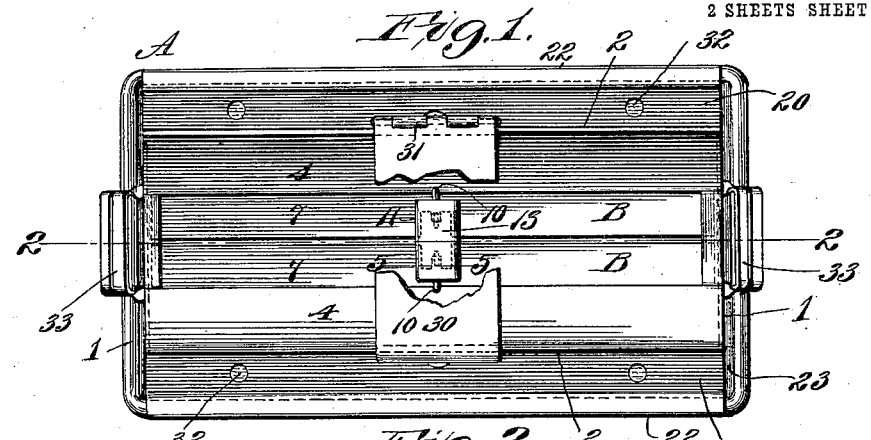
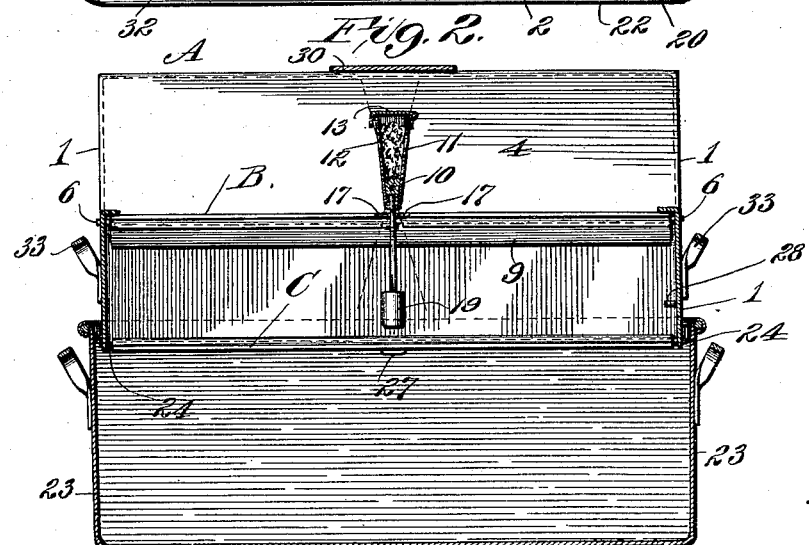
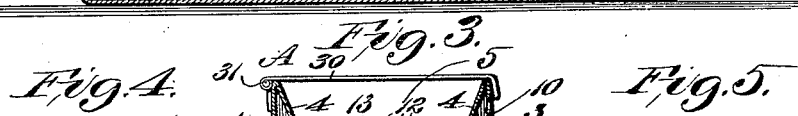
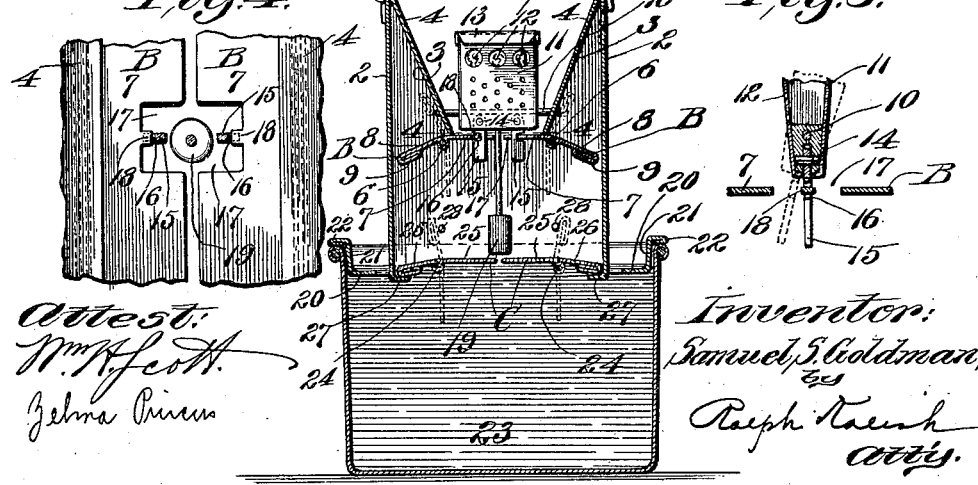
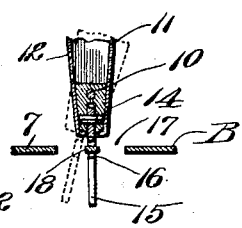

S. S. GOLDMAN.
ANIMAL TRAP.
APPLICATION FILED JAN. 18, 1913.

1,082,942.

Patented Dec. 30, 1913.

2 SHEETS—SHEET 2.

Attest:
Wm. H. Scott
Zelma Pincus

Inventor:
Samuel S. Goldman,
by Ralph Kalish Atty.

UNITED STATES PATENT OFFICE.

SAMUEL S. GOLDMAN, OF ST. LOUIS, MISSOURI.

ANIMAL-TRAP.

1,082,942.

Specification of Letters Patent. Patented Dec. 30, 1913.

Application filed January 18, 1913. Serial No. 742,887.

*To all whom it may concern:*

Be it known that I, SAMUEL S. GOLDMAN, a citizen of the United States, residing at the city of St. Louis, State of Missouri, have invented certain new and useful Improvements in Animal-Traps, of which the following is a specification, reference being had to the accompanying drawings, forming a part hereof, in which—

Figure 6:
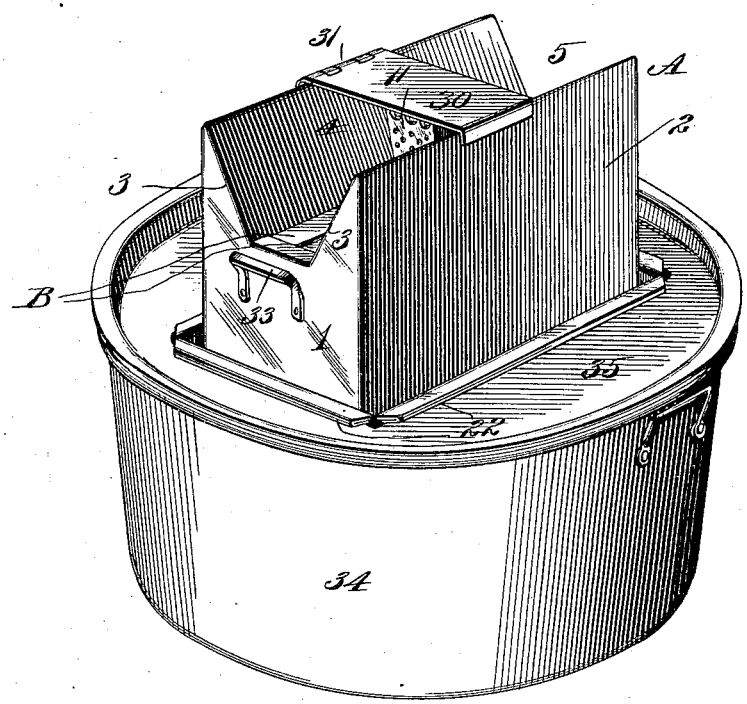
Figure 7:
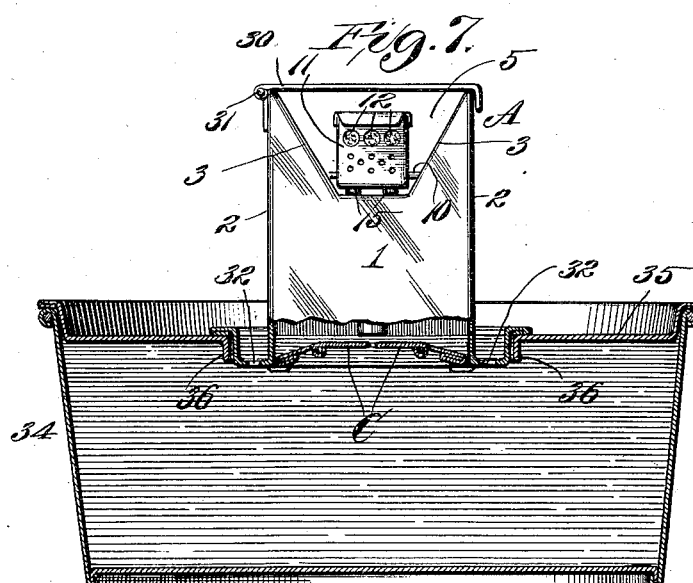

Figure 1 is a top view of my new animal trap, partly broken away; Fig. 2 is a longitudinal sectional view therethrough on the line 2—2, Fig. 1; Fig. 3 is a transverse vertical sectional view taken through the central portion of my new trap; Fig. 4 is a detail sectional view, somewhat enlarged, on the line 4—4, Fig. 3; Fig. 5 is a detail sectional view, also somewhat enlarged, on the line 5—5, Fig. 1; Fig. 6 is a perspective view of my new animal trap, showing the same in connection with a tub or circular tank; and Fig. 7 is an end elevational view of my new animal trap with the bottom portion thereof and the supporting tank or tub in vertical section.

This invention relates to certain new and useful improvements in animal traps and particularly to that class of animal traps designed and adapted for trapping and catching rats, mice, and other rodents, the objects of my invention being to provide an efficient trap for the purposes stated of durable, comparatively simple construction and one having movable parts easily, positively, and automatically operable to trap or catch the rat or other rodent by the rat or other rodent itself; to provide a trap for the purposes stated especially designed for use with a tank or vessel of water and having a bait-box and trap-doors so operatively connected that on a rat or other rodent tampering with the bait-box, the trap doors will automatically drop and open, the rat or other rodent falling into the tank or vessel of water and drowning itself; to provide a trap for the purposes stated having trap-doors and locking-members therefor automatically operable into normal or rat or rodent catching or trapping position, use of the hands to that end being thus obviated; and to improve generally upon traps of the kind stated.

With the above and other objects in view, my invention resides in certain novel features of construction, arrangement, and combination of parts, all as will hereinafter be described and afterward pointed out in the claims.

As shown in the accompanying drawings, my new trap is preferably rectangular in form and comprises a hollow body-portion A having end walls 1—1 and side walls 2—2 preferably of sheet metallic material soldered or otherwise fixed together at their ends. End walls 1—1 are from their upper outer edges cut away obliquely inwardly, as at 3—3, see particularly Figs. 6 and 7, and soldered or otherwise fixed to the oblique portions of end walls 1—1 are oppositely-disposed oblique or inclined preferably sheet metallic walls 4—4 spaced apart at their base, as shown particularly in Figs. 3, 6, and 7, and providing between side walls 2—2 a longitudinal substantially V-shaped trough 5 opening at its base into body portion A.

Extending longitudinally with side walls 2—2 and suitably hinged, as at 6—6, to oblique walls 4—4 at the base thereof, is a pair of preferably sheet metal trap doors B—B having inner oppositely-projecting flat portions 7—7 opening downwardly into body portion A and adapted normally to extend horizontally across and close the open base of trough 5, as shown in Fig. 3, and outer oppositely-projecting downwardly inclined portions 8—8 overlapped or otherwise weighted, as at 9—9, and adapted, on inner portions 7—7 being depressed out of normal position, to automatically by gravity return portions 7—7 to horizontal normal position. Suitably pivotally hingedly mounted, as by means of a pin or bolt 10 supported at its opposite ends by oblique walls 4—4 preferably midway between end walls 1—1, and swingable on pin 10 in, and lengthwise of, trough 5 above trap-doors B—B, is a preferably rectangular sheet metal bait-box 11 open at its top. Bait box 11 is mounted upon pin 10 with its length cross-wise of trough 5 and on each of its longer sides adjacent its upper edge is provided with a plurality of enlarged openings or perforations 12 through which the bait therein may be attacked by the rat or other rodent when in trough 5. The open top of bait box 11 is preferably removably closed by a hinged lid 13.

Pivotally suspended from bait-box 11, as by means of short pins 14, and swingable with bait-box 11 longitudinally or lengthwise of trough 5 and also swingable on pins 14 transversely of trough 5, for purposes hereinafter appearing, is a pair of members 15—15 oppositely recessed, as at 16—16, and adapted to engage with trap-doors B to releasably lock portions 7—7 thereof in normal position. To accommodate depending or door-locking members 15—15 and the described movements thereof, portions 7—7 of trap-doors B—B are oppositely cut-away, as at 17—17, see particularly Fig. 4, each of said door portions 7—7 being also provided with an extension 18 projecting inwardly from the base of its cut-away portion 17 and adapted to fit in the recess 16 of its coöperating locking-number 15 and thereby engage with said locking members 15 to releasably lock doors B in normal, trough-closing position.

Fixed to, and depending within body-portion A from, bait-box 11, is a weighted member 19 adapted to maintain bait-box 11 in equilibrium or in a vertically upright position.

Exteriorly fixed to, and extending preferably continuously around, end and side walls 1—1 and 2—2 and at or adjacent the base thereof, is an outwardly-projecting rectangular sheet metal portion 20 flanged upwardly, as at 21, and then outwardly and overlapped, as at 22, providing a support whereby body-portion A and its associate parts may be firmly and securely supported upon and within a suitable rectangular tank or other vessel or receptacle 23 adapted to contain water, as shown particularly in Fig. 3. Also extending longitudinally with, and at or adjacent the base of, side walls 2—2, and hinged upon rods 24—24 supported at their opposite ends by end walls 1—1, is a second pair of preferably sheet metal trap-doors C—C adapted to form the bottom of body-portion A. Trap-doors C—C are substantially similar to upper trap-doors B—B, doors C—C likewise comprising inner flat portions 25—25 adapted normally to extend horizontally between side and end walls 1—1 and 2—2 and outer weighted portions 26—26 adapted to automatically by gravity maintain inner portions 25—25 in their said normal position. Side walls 2—2 at their base are inturned or otherwise provided with inwardly-projecting flanges 27—27, upon which outer portions 26—26 of doors C—C normally rest, suitable stops 28—28 provided in end walls 1—1 limiting the swinging movement of doors C—C and preventing doors C—C overturning on portions 25—25 thereof being depressed out of normal position. As will be noted from Fig. 3, oblique walls 4—4, against which outer portions 8—8 of doors B—B contact when inner portions 7—7 thereof are depressed, correspondingly limit the swinging movement of doors B—B and prevent the same overturning on said inner portions 7—7 being depressed.

In operation, bait-box 11 will be maintained by depending weighted member 19 in a vertically upright position and trap-doors B—B will be releasably locked in their normal position, or in the position thereof shown in full lines in Fig. 3, with the portions 7—7 thereof closing the open base of trough 5, by means of said central extensions 18—18 fitting in said recesses 16—16 and thereby engaging with said locking-members 15—15. As before stated, the weighted portions 26—26 of lower trap-doors C—C normally rest on flanges 27—27 with inner portions 25—25 of doors C—C in normal horizontal body-portion closing position, or in the position thereof also shown in full lines in Fig. 3. Bait-box 11 being provided with suitable bait, as shown, a rat or other rodent, having entered trough 5, will be attracted by the bait in bait-box 11 and, on approaching bait-box 11 and nibbling at or attacking the bait therein through said openings or perforations 12, will sidewise push and thereby swing bait-box 11 with its depending door-locking members 15—15 out of equilibrium or out of a vertically upright position, locking-members 15—15 being thrown out of engagement with said extensions 18—18, whereupon, the weight of the rat or other rodent overbalancing weighted outer portions 8—8 of doors B—B, inner portions 7—7 of doors B—B will open inwardly, the rat or other rodent falling into body-portion A and upon inner portions 25—25 of lower doors C—C, which, in turn, the weight of the rat or other rodent likewise overbalancing weighted outer portions 26—26 of doors C—C, open downwardly and drop the rat or other rodent into the water in tank or vessel 23. Doors C—C and B—B now automatically by gravity through their respective weighted portions 26—26 and 8—8 return to normal position, and in so returning to normal position the inward extensions 18—18 on inner portions 7—7 of doors B—B will, bait-box 11 having been again brought by weighted member 19 into normal vertically upright position, automatically seat in said recesses 16—16 of locking-members 15—15 and doors B—B be again thereby releasably locked in normal position. Due to the pivoting of locking-members 15—15, said locking-members are permitted to swing inwardly on extensions 18—18 contacting thereagainst when doors B—B are returning to normal position, the returning movement of doors B—B being thereby in no way impeded.

To prevent the rat or other rodent jumping directly upon bait-box 11 from side walls 2—2 or from swinging bait-box 11 from side walls 2—2 to get at the bait therein, I provide a bridge or bait-protector 30 hinged to one side wall 2, as at 31, and adapted to extend across trough 5 and over bait-box 11 and rest at its free end on opposite side wall 2, as shown clearly in Figs. 3, 6, and 7. I prefer also to have the level of the water in tank or receptacle 23 substantially flush with portions 25—25 of lower doors C—C when horizontally disposed and slightly above the plane of supporting portion 20, as shown particularly in Figs. 3 and 7, portion 20 being provided accordingly with a plurality of perforations, as at 32, to permit the passage or flow of water therethrough; by doing so, and by means of lower trap-doors C—C and flat outer supporting portion 20, the rat or other rodent, which will naturally, on falling into tank 23, swim around on the surface of the water therein, is prevented from obtaining air and hence quickly drowns. That body-portion A may be conveniently placed in position upon, or removed from, a tank 23, it is preferably provided on its end walls 1—1 with suitable handles 33.

In Figs. 6 and 7 I have shown my new trap in position upon a circular tub or vessel 34, tub or vessel 34 being provided with a dish-shaped flanged sheet metal lid or cover 35 resting at its outer edge, as shown, upon the upper edge of tub or vessel 34 and provided centrally with a rectangular opening to receive body-portion A and its supporting portion 20, as shown particularly in Fig. 7. To strengthen cover or lid 35 at said central opening, the edge of lid 35 therearound is preferably flanged downwardly, as at 36.

I am aware that minor changes in the construction, arrangement, and combination of the several parts of my new trap may be made and substituted for those herein shown and described without departing from the nature and spirit of my invention.

Having thus described my invention, what I claim and desire to secure by Letters Patent is:

1. In an animal trap, the combination with a hollow body-portion, of a trough fixed to said body-portion, said trough being open-ended and having an opening at its base leading into said body-portion, a hinged door opening into said body-portion and adapted normally to close the opening in the base of said trough, a bait-box swingable within said trough above the plane of said door, said bait-box being located at a point between, and being approachable from either of, the opposite open ends of said trough, and means depending from said bait-box adapted to releasably engage with said door when the same and said bait-box are in normal position to releasably lock said door in such position and to be actuated to release said door when said bait-box is swingably actuated in either direction; substantially as described.

2. In an animal trap, the combination with a hollow body-portion, of a trough fixed to said body-portion, said trough being open-ended and having an opening at its base leading into said body-portion, a hinged pair of doors opening into said body-portion and together adapted normally to close the opening in the base of said trough, a bait-box swingable within said trough above the plane of said doors, said bait-box being located at a point between, and being approachable from either of, the opposite open ends of said trough, and means depending from said bait-box adapted to releasably engage with said doors when the same and said bait-box are in normal position to releasably lock said doors in such position and to be actuated to release said doors when said bait-box is swingably actuated in either direction; substantially as described.

3. In an animal trap, the combination with a hollow body-portion, of a trough fixed to said body-portion, said trough being open-ended and having an opening at its base leading into said body-portion, a hinged pair of doors opening into said body-portion and together adapted normally to close the opening in the base of said trough, a bait-box swingable within said trough above the plane of said doors, said bait-box being located at a point between, and being approachable from either of, the opposite open ends of said trough, and a plurality of locking members depending from, and swingable with said bait-box, said locking members being adapted to releasably engage with said doors when the same and said bait-box are in normal position to releasably lock said doors in such position and to be actuated to release said doors when said bait-box is swingably actuated in either direction; substantially as described.

4. In an animal trap, a hollow body-portion having an opening at its top, a pair of doors adapted to normally close said opening hinged longitudinally upon, and opening into, said body-portion, said doors being provided with cut-away portions at their inner edges, extensions on said doors projecting inwardly from the base of said cut-away portions thereof, a bait-box hingedly mounted on, and swingable longitudinally of, said body-portion above said doors, and locking-members depending from, and swingable with, said bait-box, said locking-members being movable in the cut-away portions of said doors and adapted to engage with said extensions to releasably lock said doors in closed position when said bait box is in normal position and to automatically disengage from said extensions to release said doors on said bait-box being swung out of normal position; substantially as described.

5. In an animal trap, a hollow body-portion, a trough open at its base within, and extending longitudinally of, said body-portion, a pair of doors hinged upon, and opening into, said body-portion, said doors extending longitudinally, and being adapted to normally close the open base, of said trough and being provided with cut-away portions at their inner edges, extensions on said doors projecting inwardly from the base of said cut-away portions thereof, a bait-box hingedly mounted upon said body-portion and swingable in, and lengthwise of, said trough above said doors, and locking members depending from, and swingable with, said bait-box, said locking members being adapted to engage with said doors to releasably lock said doors in closed position when said bait-box is in normal position and to release said doors on said bait-box being swung out of normal position; substantially as described.

6. In an animal trap, a hollow body-portion, a trough open at its base within, and extending longitudinally of, said body-portion, a pair of doors hinged upon, and opening into said body-portion, said doors extending longitudinally, and being adapted to normally close the open base, of said trough and being provided with cut-away portions at their inner edges, extensions on said doors projecting inwardly from the base of said cut-away portions thereof, a bait-box pivotally mounted upon said body-portion and swingable in, and lengthwise of, said trough above said doors, locking members depending from, and swingable with, said bait-box, said locking members being adapted to engage with said doors to releasably lock said doors in closed position when said bait-box is in normal position and to release said doors on said bait-box being swung out of normal position, and a weighted member suspended by and depending from said bait-box adapted automatically by gravity to maintain said bait-box and its depending door locking-members in normal position; substantially as described.

7. In an animal trap, a hollow body-portion having an opening at its top, a pair of trap doors hinged upon said body-portion, said doors comprising inner portions adapted to normally close said opening and weighted outer portions adapted to maintain said inner portions in, and when actuated to automatically by gravity return the same to, normal position, a bait-box mounted on said body-portion above said doors, and a plurality of locking members depending from said bait-box to between said doors, said locking members being pivoted on said bait-box to permit said doors to return to normal position and being adapted to automatically engage with said doors at their inner portions when in normal position to releasably lock the same in such position; substantially as described.

8. In an animal trap, a hollow body-portion, a trough extending longitudinally within said body-portion, said trough being open at its base, a pair of doors hinged longitudinally upon, and opening into, said body-portion, said doors comprising inner portions adapted to normally close the open base of said trough and weighted outer portions adapted to maintain said inner portions in, and when actuated to automatically by gravity return the same to, normal position, a bait-box mounted on said body-portion within said trough and above said doors, and a pair of locking-members depending from said bait-box to between said doors, said locking members being pivoted on said bait-box to permit said doors to return to normal position and being adapted to automatically engage with said doors at their inner portions when in normal position to releasably lock the same in such position; substantially as described.

In testimony whereof, I have signed my name to this specification, in the presence of two subscribing witnesses.

SAMUEL S. GOLDMAN.

Witnesses:
RUTH PETERSON,
ZELMA PINCUS.

---

Copies of this patent may be obtained for five cents each, by addressing the "Commissioner of Patents, Washington, D. C."